US008542435B2

(12) United States Patent
Raybaut et al.

(10) Patent No.: US 8,542,435 B2
(45) Date of Patent: Sep. 24, 2013

(54) NESTED-CAVITY OPTICAL PARAMETRIC OSCILLATOR FOR FAST FREQUENCY TUNING

(75) Inventors: Myriam Raybaut, Gif S/Yvette (FR); Bertrand Hardy, Bourg la Reine (FR); Antoine Godard, Palaiseau (FR); Michel Lefebvre, Orsay (FR)

(73) Assignee: Office National d'Etudes et de Recherches Aerospatiales (ONERA), Chatillon (FR)

( * ) Notice: Subject to any disclaimer, the term of this patent is extended or adjusted under 35 U.S.C. 154(b) by 0 days.

(21) Appl. No.: 13/426,522

(22) Filed: Mar. 21, 2012

(65) Prior Publication Data
US 2012/0262779 A1 Oct. 18, 2012

(30) Foreign Application Priority Data
Mar. 25, 2011 (FR) ...................................... 11 00897

(51) Int. Cl.
*G02F 1/39* (2006.01)
*G02F 1/35* (2006.01)
(52) U.S. Cl.
USPC ........................................................ 359/330
(58) Field of Classification Search
USPC ................................ 359/326–332; 372/21–22
See application file for complete search history.

(56) References Cited

U.S. PATENT DOCUMENTS

| 5,995,522 | A | * | 11/1999 | Scherrer et al. | 372/21 |
| 6,751,010 | B1 | * | 6/2004 | Richter | 359/330 |
| 7,349,149 | B2 | * | 3/2008 | Lefebvre et al. | 359/330 |
| 8,279,517 | B2 | * | 10/2012 | Lefebvre et al. | 359/330 |

OTHER PUBLICATIONS

B. Hardy et al., "Compact, single-frequency, doubly resonant optical parametric oscillator pumped in an achromatic phase-adapted double-pass geometry", Optic Letters, Mar. 1, 2011, pp. 678-680, vol. 36, No. 5, Optical Society of America, Washington, DC, US.
Joseph E. Schaar et al., "Characterization and control of pulse shapes in a doubly resonant synchronously pumped optical parametric oscillator", Applied Optics, Aug. 20, 2010, pp. 4489-4493, vol. 49, No. 24, Optical Society of America, Washington, DC, US.
Haibo Wang et al., "Tunable continuous-wave doubly resonant optical parametric oscillator by use of a semimonolithic KTP crystal", Applied Optics, Feb. 20, 2002, vol. 41, No. 6, Optical Society of America.

* cited by examiner

*Primary Examiner* — Daniel Petkovsek
(74) *Attorney, Agent, or Firm* — Blakely Sokoloff Taylor & Zafman (57) ABSTRACT

Nested-cavity optical parametric oscillator for fast frequency tuning including a source of pump radiation ($f_p$), a non linear crystal situated within two resonant cavities for the signal and complementary radiations of respective optical lengths $l_s$ and $l_c$. A doubly resonant resonator for a single pair of longitudinal signal and complementary modes is formed having a crystal of prismatic shape, the crystal (7) being moveable within the plane xz along a direction forming a non zero angle $\beta$ with respect to the direction x. The value of $\beta$ is fixed so that the movement of the crystal is accompanied by a change in the respective optical lengths $l_s$ and $l_c$ of the two resonant cavities in a ratio such that the double resonance condition between the longitudinal modes of each cavity is maintained.

9 Claims, 7 Drawing Sheets

Prior art

Figure 1

Prior art

Figure 2

Prior art

NESTED-CAVITY OPTICAL PARAMETRIC OSCILLATOR FOR FAST FREQUENCY TUNING

The present invention relates to doubly resonant optical parametric oscillators constituted from two separately resonant cavities for each of the waves generated by second order parametric conversion. In particular, it relates to the improvement of their frequency tuning capabilities, both as regards scanning speed and spectral range.

Second order non-linear processes are used in optics to produce, from a primary radiation source, new radiations that can be extensively frequency tuned. One of these processes, known from the prior art as 'optical parametric conversion' makes it possible to generate two radiations, known as signal and complementary or idler, from a radiation known as pump delivered by a coherent light source such as a laser. The frequencies of the three radiations ($f_s$, $f_c$ and $f_p$) are linked by the law of conservation of energy, i.e.: $f_s+f_c=f_p$, where the indices (s, c or p) are related to the signal, complementary and pump radiations, respectively.

Practically, optical parametric conversion is obtained by propagating the three radiations through a non centro-symmetric crystal having a second order optical non-linearity. For the parametric conversion process to be efficient throughout the propagation of the radiations through the crystal, it is necessary that the wave vectors of the different radiations noted $k_j$, with j=p, s or c, respect a condition known from the prior art as 'exact phase matching condition' or 'quasi-phase matching condition'. The exact phase matching condition may be satisfied in crystals having an optical birefringence whereas the quasi-phase matching condition is fulfilled in crystals having a periodic inversion of the sign of the optical non-linearity, this can be obtained by different methods: inversion of ferroelectric domains [L. E. Myers, R. C. Eckardt, M. M. Fejer, R. L. Byer, W. R. Bosenberg and J. W. Pierce, 'Quasiphasematched optical parametric oscillators in bulk periodically poled LiNbO3', J. Opt. Soc. Amer. B, 12, pp. 2102-2116, 1995], alternated crystalline growth [K. L. Vodopyanov, O. Levi, P. S. Kuo, T. J. Pinguet, L. S. Harris, M. M. Fejer, B. Gerard, L. Becouam, E. Lallier, 'Optical parametric oscillation in quasi-phase-matched GaAs', Opt. Lett., 29, no 16, pp 1912-1914, 2004] or instead total internal reflection [M. Raybaut, A. Godard, R. Haïdar, M. Lefebvre, Ph. Kupecek, Ph. Lemasson, E. Rosencher, 'Generation of mid-infrared radiation by self-difference frequency mixing in chromium-doped zinc selenide', Opt. Lett., 31, no 2, pp 220-222, 2006]. As regards ferroelectric materials (lithium niobate, lithium tantalate, etc.), very widely used at the present time, the inversion of domains is carried out in a periodic manner with an inversion period equal to twice the coherence length ($l_{coh}$), where $l_{coh}$ is defined as the length that covers the three radiations so that their relative dephasing $\Delta\Phi$, given by: $\Delta\Phi=\phi_p-(\phi_s+\phi_c)$, change of $\pi$, $\phi_j$ is the dephasing associated with the propagation of the radiation j over a length $l_{coh}$. The quasi-phase matching condition is then written $k_p=k_s+k_c+k_\Lambda$ where $k_\Lambda$ is defined by $|k_\Lambda|=\pi/l_{coh}$.

The energy distribution between the signal and complementary radiations (and consequently the values of the frequencies $f_s$, $f_c$ produced by parametric conversion) is adjustable by acting on the phase matching or quasi-phase matching condition. Several parameters such as the temperature, the crystalline orientation or the inversion period of the sign of the optical non-linearity make it possible to modify the phase matching and thus to tune over very wide ranges the signal and complementary frequencies derived from the conversion of the primary laser radiation.

The parametric conversion of a pump wave into signal and complementary radiations is particularly interesting for numerous applications. At the forefront of these are spectroscopy applications such as the detection of molecular or atomic species that can exist in trace amounts. The very wide spectral tuning range of the signal and complementary radiations then make it possible to cover the different frequencies of absorption of one or more species that it is targeted to detect. Nevertheless, in order to know the relative abundances of different species, it is necessary that the tunable radiation produced by parametric conversion shows a high spectral purity in order to be able to tune the frequency of the parametric source selectively on the absorption frequencies of each species without being perturbed by the presence of the absorption transitions of other compounds.

Figure 1:
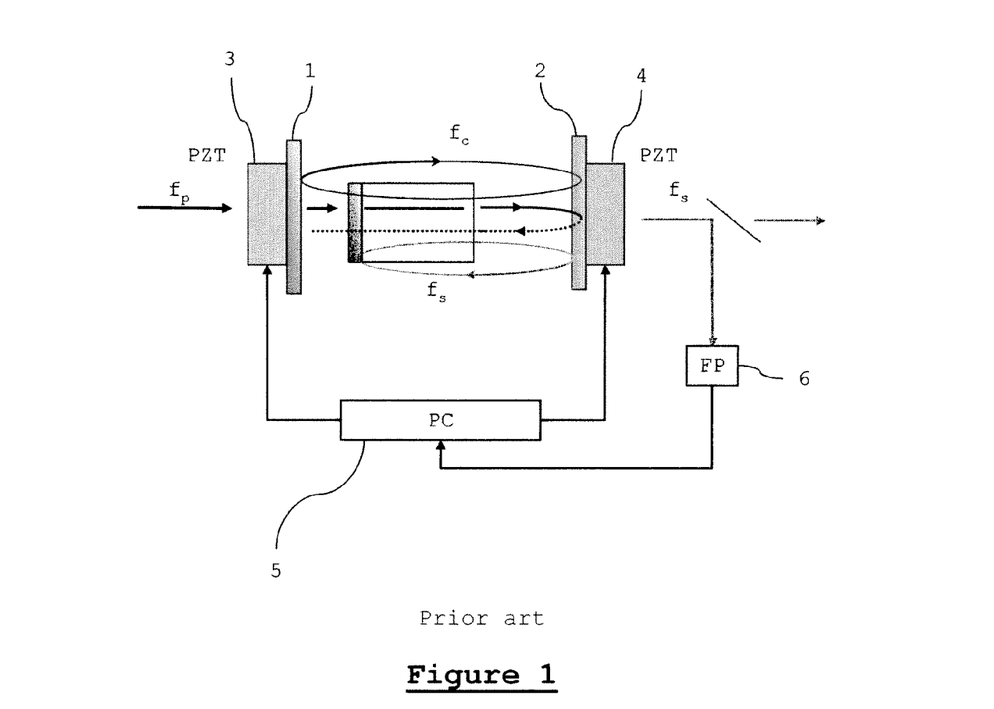
FIG. 1 represents an optical parametric oscillator with achromatic phase-maintaining pump return, known from the prior art, with its frequency control device for continuous wavelength scanning.
Figure 2:
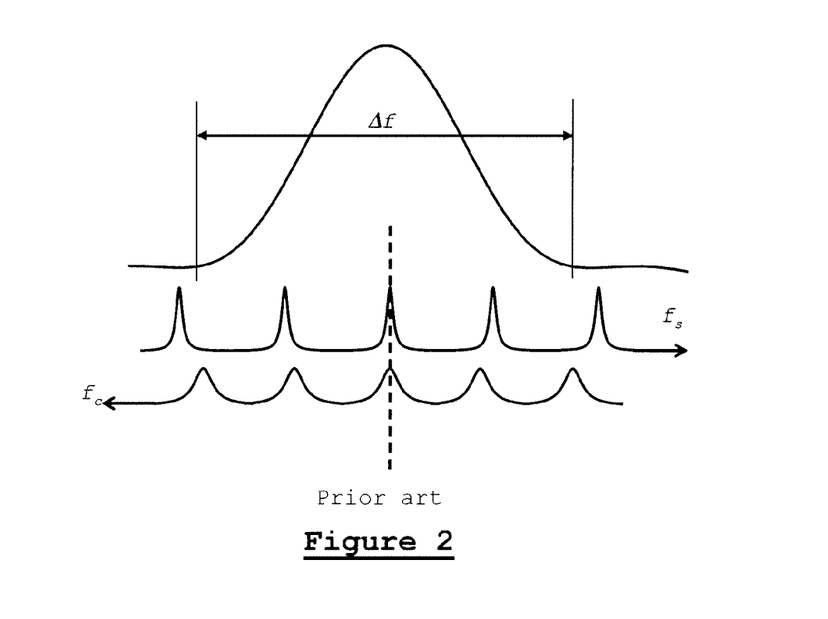
FIG. 2 illustrates the single frequency operation of the oscillator obtained by making a longitudinal mode of the signal cavity coincide with a longitudinal mode of the complementary cavity in the width of the parametric gain curve ($\Delta f$)

The production of parametric radiation combining both spectral purity and very wide spectral tuning range is obtained by inserting the non-linear crystal in a particular optical resonator, known from the prior art as ['Optical parametric oscillator with achromatic phase-maintaining pump reflection', FR2902940, PCT no EP2007/056438]. FIG. 1 represents such an oscillator where the signal and complementary waves oscillate in two nested optical cavities whereas the pump radiation makes a double path through the non-linear crystal, conserving an optimal value of the relative dephasing $\Delta\Phi$ after reflection by the achromatic mirror 2, so that parametric conversion is efficient back and forth whatever the operating wavelength of the optical parametric oscillator. The emission of a radiation of great spectral purity or single frequency operation is obtained by choosing the lengths of each cavity so that, in the parametric gain curve, only one single coincidence exists between the longitudinal modes of the two cavities so that the emission is only established on this coincidence, as illustrated in FIG. 2.

The optical parametric oscillator with achromatic phase-maintaining pump reflection offers several advantages: low oscillation threshold, compactness and emission of a radiation of high spectral purity all over the parametric conversion range. The continuous tuning of the frequency, or in other words maintaining the oscillation on the same coincidence, is obtained by shifting this coincidence of modes of the signal and complementary cavities in the parametric gain curve. To do this, it is necessary to adjust simultaneously and very finely at least two parameters (the lengths of each cavity using piezoelectric actuators or the pump frequency and the length of one cavity or instead the temperature of the crystal and the length of one cavity, for example) so that the coincidence of modes between the two cavities, illustrated by FIG. 2, is very precisely maintained throughout frequency scanning. A first order calculation, performed by neglecting the dependence of the index of refraction of the crystal with the wavelength, shows that the coincidence of modes is maintained if the positions of the input 1 and output 2 mirrors, vary in the ratio:

$$\frac{\delta M_1}{\delta M_2} = -(1+R)$$

with $$R = \left(\frac{f_s}{f_c}\frac{l_c}{l_s}\right)$$

where $\delta M_1$ and $\delta M_2$ are the displacements of the input 1 and output 2 mirrors while $l_s$ and $l_c$ are the optical lengths of the signal and complementary cavities, respectively. This relation between the displacements of mirrors 1 and 2 demonstrates that one has to change linearly the optical lengths of the signal and complementary cavities in opposite directions to maintain the coincidence of modes.

Figure 3:
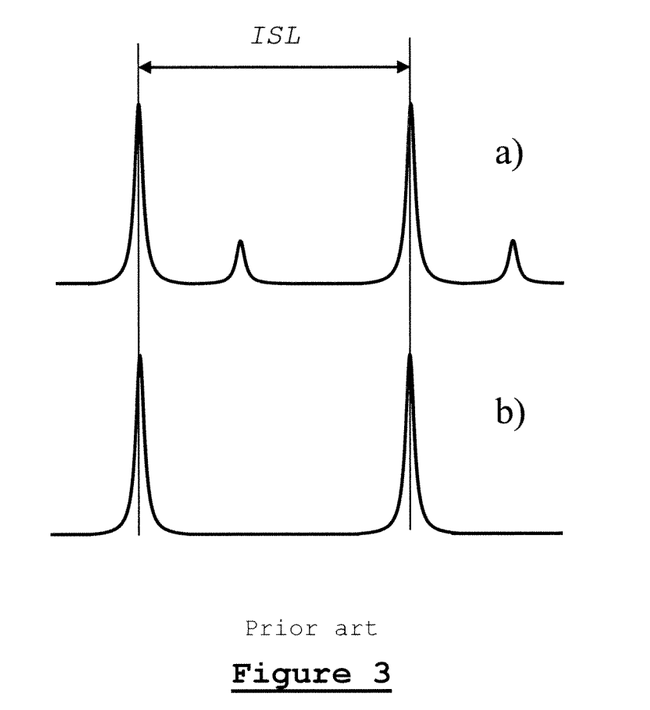
FIG. 3 shows the response of a Fabry Perot étalon with appearance of a parasite mode (case a) and in the case of a pure single frequency operation (case b), each transmission peak is reproduced in an identical manner after a frequency deviation equal to the value of a free spectral range (FSR) of the étalon.

If the above relation is applied without any particular attention, in other words without correcting the movement imperfections due to the non-linearities or the hysteresis of the piezoelectric actuators 3 and 4, the continuous scanning of the signal or complementary frequency may only be obtained over a limited range, of the order of 10 GHz. To obtain a frequency tuning over a more extended range, it becomes necessary to correct the imperfections of piezoelectric actuators which are detrimental to the linearity of the movements and thus to maintain the coincidence of modes. The correction is made by regularly monitoring the spectral purity of the signal or complementary radiations emitted during scanning. This regular control may be carried out automatically using a micro-computer 5 interfaced with a spectrometer or with a wavemeter or using a standard Fabry Perot étalon 6. It consists in finely correcting the position of one of the mirrors 1 or 2 to suppress the existence of an unwanted mode, a situation illustrated by FIG. 3 which shows the response of the Fabry Perot étalon with and without existence of a parasite mode, case a) and b), respectively. The response of the étalon shows a succession of peaks regularly spaced apart by a free spectral range (FSR), distance corresponding to a variation in the thickness of the étalon equal to a half wavelength.

After correction, it is possible to tune continuously, without mode hop, the frequency of the oscillator over typically 80% of the full width of the parametric gain curve, noted $\Delta f$. A continuous tuning range is thereby obtained, which generally exceeds one hundred of GHz for a pulsed operation of the parametric oscillator in the nanosecond regime which is very widespread. This scanning method has nevertheless two major drawbacks: a cost increase related to the price of the control means used (microcomputer and Fabry Perot étalon, for example) and a limitation of the scanning speed due to the necessity of monitoring periodically the spectral output. In addition, if one wants to extend the tuning range beyond the parametric gain width, it is necessary to act on a third parameter in order to shift the maximum of the parametric gain curve as the frequency scanning proceeds, which complicates the procedure.

The aim of the proposed invention is to overcome these limitations, thereby making it possible to extend the field of use of this type of source, in particular its range and its rapid frequency scanning capability, while reducing its implementation cost.

The doubly resonant optical parametric oscillator with achromatic phase-maintaining pump reflection comprising a pump radiation source at a frequency comprises, according to the invention, in the forward propagation direction of the pump radiation along a direction z, a non-linear crystal having a front face and a rear face, an achromatic mirror situated downstream of the rear face of the crystal defining with a first mirror deposited on the front face of the crystal a first resonant cavity for the signal radiation at the frequency $f_s$ and with a second mirror situated upstream of the front face of the crystal a second resonant cavity for the complementary radiation at the frequency $f_c$, the two cavities, of respective optical lengths $l_s$ and $l_c$, forming a doubly resonant resonator for a single pair of longitudinal signal and complementary modes, the pump radiation at the frequency $f_p$ makes through the crystal a forward path entering through the front face of the crystal and exiting through the rear face of the crystal, then, after reflection on the achromatic mirror, a backward path entering via the rear face of the crystal, the optical indices of which are respectively $n_s$ and $n_c$ at the signal $f_s$ and complementary $f_c$ frequencies, the crystal is of prismatic shape with its rear face inclined along a non-zero angle $\alpha$ with respect to the direction x orthogonal to the direction z of propagation of the radiations, the crystal being moveable within the xz plane the invention is characterised in that the crystal is moveable in translation within the plane xz along a direction inclined by a non-zero angle $\beta$ with respect to the direction x such that $$tg\beta = \frac{(n_c - 1) + R \cdot (n_s - 1)}{R} tg\alpha,$$

with $$R = \left(\frac{f_s}{f_c} \frac{l_c}{l_s}\right),$$

to modify simultaneously the respective optical lengths $l_s$ and $l_c$ of the two resonant cavities in a ratio such that the double resonance for a single pair of longitudinal signal and complementary modes is maintained and as a result the values of the frequencies $f_s$ and $f_c$ are thus continuously tunable over a wide range, without having to use a device for monitoring and correcting the lengths of cavities to guarantee the coincidence of modes between the two cavities.

The operating principle of the invention is the following: moving by translation within the xz plane the moveable crystal in the direction inclined by the angle $\beta$ with respect to the direction x, the transversal and longitudinal positions of the crystal in the two cavities are simultaneously modified and in this way the optical lengths of the signal ($l_s$) and complementary ($l_c$) cavities:

$l_s$ changes because, firstly, the optical distance covered in the crystal is modified given its prismatic shape and the transversal component of the movement (along the direction x); secondly, the longitudinal components act on the position of the crystal along the direction z and thus on the position of the mirror deposited on the entry face of the non-linear crystal;

$l_c$ changes because the optical distance covered in the crystal is modified given its prismatic shape and the transversal component (along the direction x) of the movement.

For a given angle $\alpha$, one needs to choose the value of the angle $\beta$ so that one cavity becomes longer whereas the other becomes shorter in the ratio that maintains the coincidence of modes. A first order calculation (disregarding both the variation of the index of the crystal as a function of the change of wavelength obtained and the dependence of R as a function of slight variations in $l_s$ and $l_c$ makes it possible to easily find the relation between the angles $\alpha$ and $\beta$ to maintain the coincidence of modes:

$$tg\beta = \frac{(n_c - 1) + R \cdot (n_s - 1)}{R} tg\alpha$$

where $n_s$ and $n_c$ are the optical indices of the non linear crystal at the signal and complementary frequencies.

Advantageously, the non linear crystal comprises periodic inversion domains traversed successively by the radiations along the direction z making it possible to operate in quasi-phase matching. In this respect, reference may advantageously be made to the teachings of the invention having given rise to the patent application FR 2 902 940.

According to this quasi-phase matching operating mode, the rear face of the last periodic domain traversed before reflection on the achromatic mirror is oriented along a plane intersecting the plane xy, the direction y being orthogonal to the directions x and z, along a straight line parallel to the direction y and as a result the relative phase value $\Delta\Phi$ between the waves is maintained whatever the position of the crystal in the direction x.

In order to benefit from a continuous tuning range greater than the width of the parametric gain curve, the periodicity of the inversion domains of the crystal varies continuously in the direction x (crystal known as 'fan-out periodic poled crystal'). The variation in periodicity of said crystal along the direction x may then be such that the maximum of the parametric gain curve shifts in a synchronous manner with the double resonance ratio of the signal and complementary cavities. Thus, by acting on a single parameter, it is possible to continuously tune the frequency of the optical parametric oscillator over a range that is not limited to the width of the parametric gain curve ($\Delta f$).

Obviously, the more extended the frequency tuning range, the more the variation in optical lengths of the cavities due to the dispersion of the optical index and the movement of the crystal itself need to be taken into account. In other words, the relation between $\alpha$ and $\beta$, established above to the first order (R, $n_s$ and $n_c$ assumed constant), ceases to be valid for very wide scannings. However, a complete calculation shows that the deviation from the relation established above remains below 1% for a continuous tuning range of 1 THz. If necessary, the frequency of the pump laser can be adjusted. It is then possible to compensate the optical dispersion of the crystal and the variation in the lengths of the cavities to obtain continuous tuning over a very extended frequency range without affecting the scanning speed. The frequency of the pump laser may be delivered by a tunable laser such as a fibre laser.

It is also possible to compensate the optical dispersion of the crystal leading to the variation in the optical lengths of the cavities without affecting the scanning speed, by modifying the optical length of the non linear crystal by electro-optical effect, during scanning.

Other characteristics and advantages of the invention will become clearer from the description that follows and the non-limiting examples.

Figure 4:
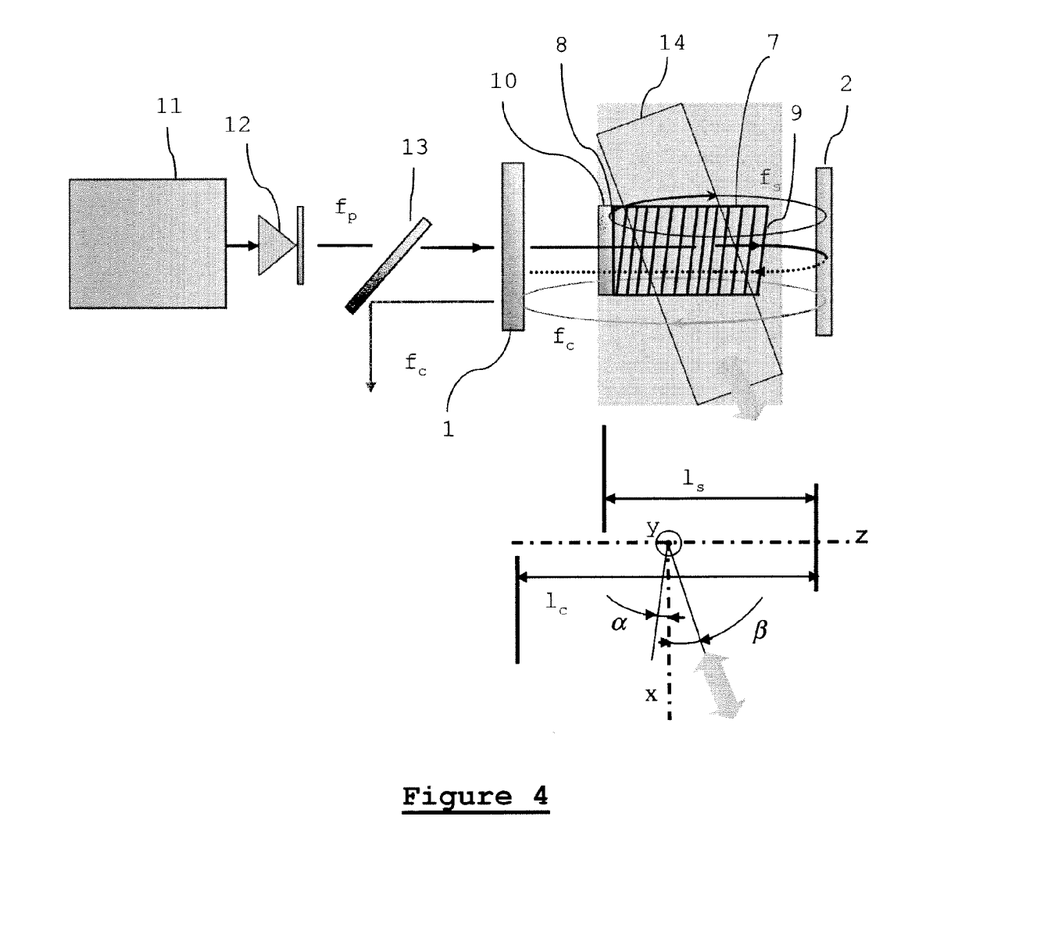
FIG. 4 shows schematically the implementation of the invention.

A general diagram of the implementation of the invention is given in FIG. 4. The pump laser 11 delivers a primary radiation at the frequency $f_p$ which passes through an optical isolator 12 then a beam splitter 13 making it possible to filter the complementary radiation of the pump radiation which has passed through the non-linear crystal 7 before being reflected by the achromatic mirror 2. Said achromatic mirror 2 reflects all or part of the three radiations while maintaining constant the relative dephasing between these radiations ($\Delta\Phi$) whatever the signal or complementary frequency of the optical parametric oscillator. The mirror 8, deposited on the input face of the non-linear crystal 7 is totally reflecting at the signal frequency although totally transparent to the other two wavelengths, whereas the mirror 1 is transparent to the pump and signal radiations while partially reflecting the complementary wavelength which is available for the user after reflection on the beam splitter 13. The non-linear crystal 7 is mounted on a stage moving in translation in the plane xz 14 which ensures the movement along the angle $\beta$ with respect to the direction x with a view to the continuous tuning of the frequency. The angles $\alpha$ and $\beta$ are marked in FIG. 4 with respect to the direction x orthogonal to the direction z of propagation of the radiations, the direction y is orthogonal to the figure plane.

Figure 5:
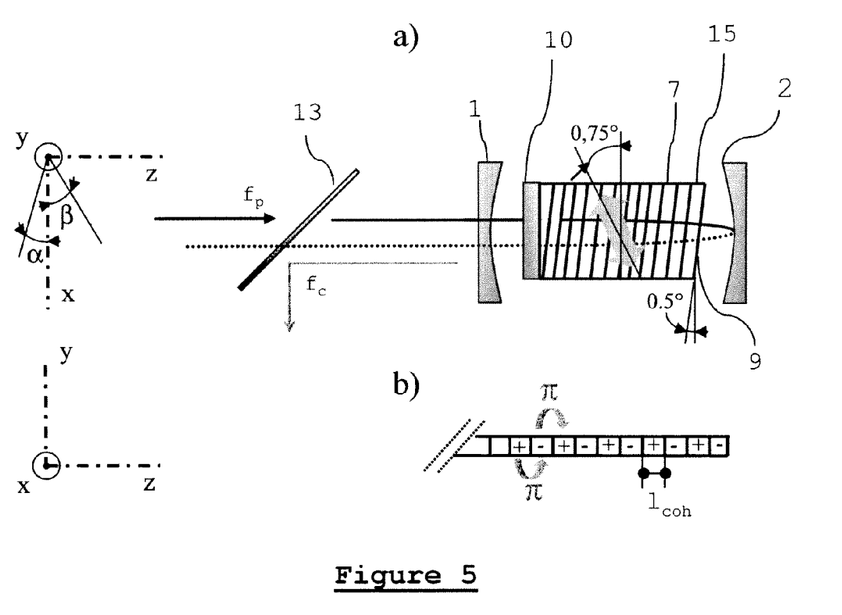
FIG. 5 shows an implementation of the invention with a crystal of periodically poled lithium niobate (PPLN), a) diagram of the cavity, b) side view of the PPLN crystal illustrating the inversion domains.

FIG. 5 shows a first implementation of the invention with a periodically poled lithium niobate (PPLN) crystal pumped by a Nd:YAG laser at 1.064 µm with a view to produce a signal wave at 1.45 µm ($n_s$~2.14) and a complementary wave at 4 µm ($n_c$~2.06), for a conventional type 0 quasi-phase matching. The last periodic domain 15 traversed before reflection on the achromatic mirror 2 is oriented parallel to the exit face 9 of the crystal 7, and as a result the relative phase value $\Delta\Phi$ between the waves is maintained whatever the position of the crystal in the direction x. The exit face 9 is anti-reflection coated for the three wavelengths in order to reduce Fresnel losses at the crystal exit. The ratio of the optical lengths of the cavities ($l_s/l_c$) is chosen equal to 0.96 (typical value that makes it possible to obtain a stable single frequency operation). The application of the relation between the angles $\alpha$ and $\beta$ shows that in these conditions $\beta$~1.5$\alpha$. For a typical value of the angle $\alpha$=0.5° and an optical length $l_c$ of 12 mm (cavity containing a lithium niobate crystal of 5 mm long), a tuning range of 58 GHz is obtained for a movement of the stage of 1 mm. Knowing that the speed of movement of a commercially available stage is of the order of 5 mm/s, it is found that the scanning speed is then 290 GHz/s, whereas it is typically 0.5 GHz/s when the two lengths of cavity are adjusted separately using piezoelectric actuators and that movement imperfections are corrected by implementing a wavelength measurer interfaced to a micro-computer [A. Berrou, M. Raybaut, A. Godard, M. Lefebvre, Appl. Phys B, 98 (2010)].

Figure 6:
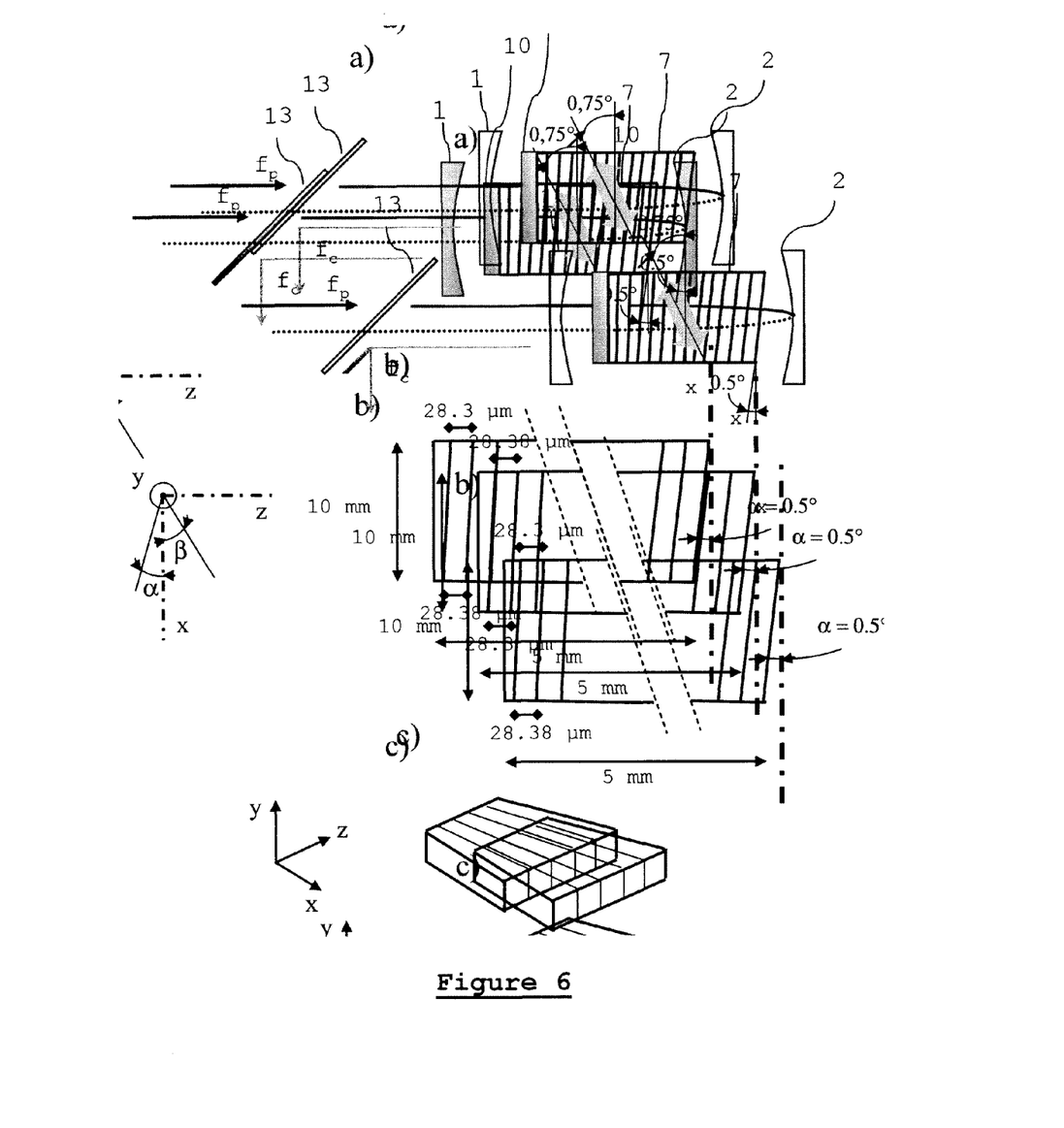
FIG. 6 is relative to an implementation of the invention with a periodically poled lithium niobate crystal having a continuously variable inversion period along the direction x (fan-out type PPLN crystal), a) general diagram of the cavity, b) illustration of the variation in the inversion period along the direction x, c) 3D illustration of the crystal.

FIG. 6 illustrates an implementation of the invention with a lithium niobate crystal with continuously variable inversion period along the direction x, 'fan-out' type crystal. For the preceding conditions (5 mm long crystal of lithium niobate operating around 4 μm for the complementary wavelength with α=0.5° and β=0.75°), it may be deduced that a continuous frequency tuning range of 580 GHz is obtained for a transversal movement of the stage equal to 10 mm. The central wavelength of the optical parametric oscillator will follow this frequency variation by choosing a 'fan-out' crystal, the inversion period of which varies between 28.3 and 28.38 μm over 10 mm. The geometric specifications of such a crystal are for example a length along the direction z of 5 mm, a thickness of 1 mm along the direction y and 10 mm height along the direction x, the length of each domain varying from 28.3 μm to 28.38 μm as indicated in part b) of FIG. 6.

Figure 7:
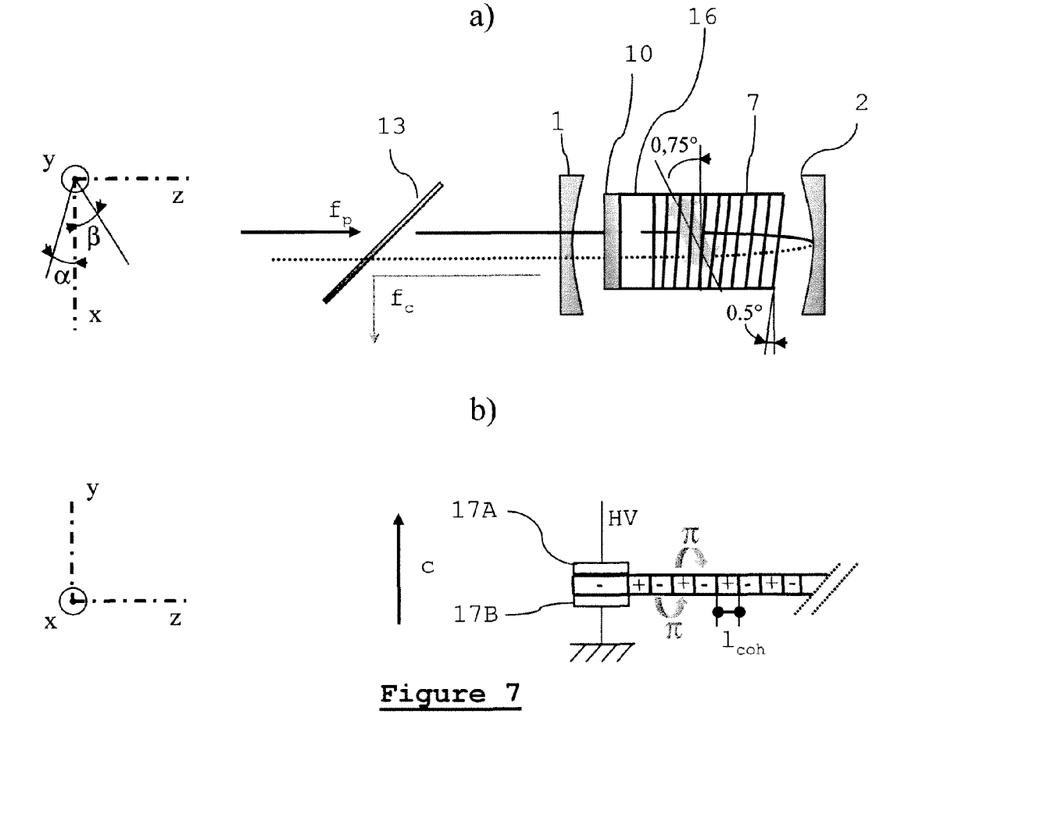
FIG. 7 is relative to an implementation of the invention with a part of the crystal of variable optical length by electro-optical effect, a) diagram of the cavity, b) sectional view of the crystal illustrating the variable optical length part with the command electrodes.

FIG. 7 illustrates an operating mode which makes it possible to compensate the optical dispersion of the crystal and the variation in the ratio R in the case of continuous frequency tuning over a very wide range, typically greater than 1 THz. The lithium niobate crystal is here used in type II quasi-phase matching. In order to compensate its optical dispersion, it comprises a first domain 16 of variable optical length, not inversed periodically. For this type of type II phase matching, the complementary wave is polarised along the crystallographic axis c of the crystal, oriented along the direction y, and the signal and pump waves are polarised orthogonally to the crystallographic axis c. By application of an electric field along the crystallographic axis c of the crystal using electrodes 17A and 17B, the optical length of the complementary resonant cavity is adjusted in order to compensate the optical dispersion between the three radiations and the variation in the ratio R, which no longer becomes negligible for a frequency tuning over a very wide range.

Figure 8:
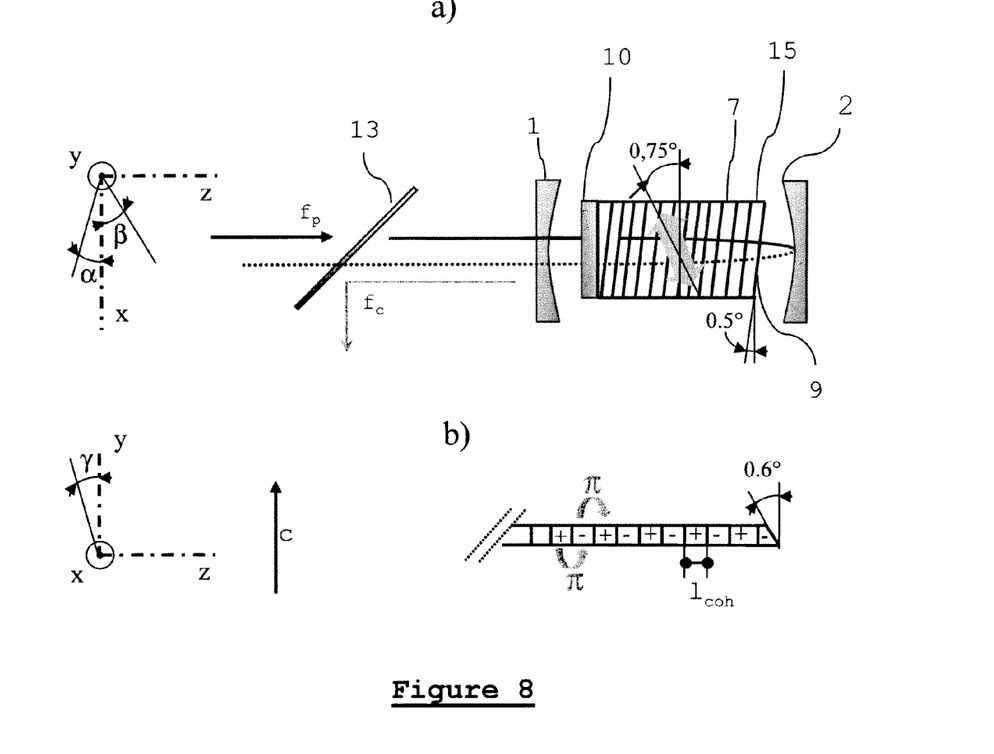
FIG. 8 is relative to an implementation of the invention with a crystal having a second angle $\gamma$ along the direction y in order to be able to adjust the value of the relative dephasing $\Delta\Phi$ between the waves by simple movement of the crystal in the direction y, perpendicular to the plane xz.

FIG. 8 shows an operating mode which makes it possible to adjust the value of the phase relative to the return (ΔΦ) between the waves by modification of the position along the direction y of the crystal in the optical cavity. The adjustment of the position of the crystal 7 along the direction y may be obtained by inserting for example a piezoelectric wedge between the moving stage and the crystal. With this aim, the rear face (9) of the last periodic domain (15) is polished so that it forms an angle γ with respect to the direction y in any section along a plane parallel to the plane yz. Depending on the crystal used, the value of the angle γ is obtained from prior knowledge of the values of the optical indices. Thus, for a crystal of lithium niobate of 1 mm thickness, the value of the angle γ is chosen around 0.6° in order to be able to vary by it the value of ΔΦ and thereby obtain the optimal phase so that the parametric conversion is efficient out as it is in return. Once the adjustment of the phase is done, the continuous frequency tuning is obtained as previously, by moving the crystal along the angle β with respect to the direction x. This implementation configuration makes it possible to reduce the polishing constraints of the crystal 7, in particular it is not necessary to specify the thickness of the last domain 15, given the possibility of varying this thickness by the vertical movement of the crystal.

Obviously, the types of embodiment proposed do not represent an exhaustive list of possible embodiments.

The invention claimed is:

1. A doubly resonant optical parametric oscillator with achromatic phase-maintaining pump reflection comprising: a pump radiation source at a frequency $f_p$, and comprising in the forward propagation direction of the pump radiation:

a non linear crystal having a front face and a rear face, an achromatic mirror situated downstream of the rear face of the crystal, defining with a first mirror situated on the front face of the crystal, a first resonant cavity for the radiation signal at the frequency $f_s$ and with a second mirror situated upstream of the front face of the crystal, a second resonant cavity for the complementary radiation at the frequency $f_c$, the two cavities, of respective optical lengths $l_s$ and $l_c$, forming a doubly resonant resonator for a single pair of longitudinal signal and complementary modes, the pump radiation at the frequency $f_p$ makes through the crystal a forward path entering via the front face of the crystal and exiting via the rear face of the crystal, then, after reflection on the achromatic mirror, a backward path entering via the rear face of the crystal, the optical indices of which are respectively $n_s$ and $n_c$ at the signal $f_s$ and complementary $f_c$ frequencies, the crystal is wedged with its rear face inclined along a non zero angle α with respect to the direction x orthogonal to the direction z of propagation of the radiations, the crystal being moveable in the plane xz, wherein the crystal is moveable in translation in the plane xz along a direction inclined by a non zero angle b with respect to the direction x such that $$tg\beta = \frac{(n_c - 1) + R \cdot (n_s - 1)}{R} tg\alpha,$$

with $$R = \left(\frac{f_s}{f_c} \frac{l_c}{l_s}\right),$$

to modify simultaneously the respective optical lengths $l_s$ and $l_c$ of the two resonant cavities in a ratio such that the double resonance for a single pair of longitudinal signal and complementary modes is maintained, and as a result the values of the frequencies $f_s$ and $f_c$ are continuously tunable over a wide range.

2. A doubly resonant optical parametric oscillator according to claim 1, wherein the non-linear crystal comprises periodic inversion domains traversed successively by the radiations along the direction z making it possible to operate in quasi-phase matching.

3. A doubly resonant optical parametric oscillator according to claim 2, wherein the rear face of the last periodic domain traversed before reflection on the achromatic mirror is oriented along a plane intersecting the plane xy, along a straight line parallel to the direction y, and as a result the relative phase value ΔΦ between the waves is maintained whatever the position of the crystal in the direction x.

4. A doubly resonant optical parametric oscillator according to claim 2, wherein the periodicity of the inversion domains of the crystal varies continuously in the direction x.

5. A doubly resonant optical parametric oscillator according to claim 4, wherein the variation in the periodicity along the direction x is such that the maximum of the parametric gain curve shifts in a synchronous manner with the double resonance ratio.

6. A doubly resonant optical parametric oscillator according to claim 3 or claim 4, wherein the rear face of the last periodic domain is polished so that it forms an angle γ with respect to the direction y in any section along a plane parallel to the plane yz, and as a result the value of the phase relative to the return (ΔΦ) between the waves may be adjusted by modification of the position along the direction y of the crystal in the optical cavity.

7. A doubly resonant optical parametric oscillator according to claim 2, wherein the first domain is of variable optical length and as a result it is possible to compensate the optical dispersion of the crystal and the variation in the optical lengths of the cavities to obtain continuous tuning over a frequency range of more than one THz.

8. A doubly resonant optical parametric oscillator according to claim 7, wherein the complementary wave is polarised along the crystallographic axis c of the crystal and the signal and pump waves being polarised orthogonally to this axis c oriented along the direction y, an electric field is applied along the axis c to adjust the optical length of the complementary resonant cavity in order to compensate the optical dispersion between the three radiations and the variation in the ratio R.

9. A doubly resonant optical parametric oscillator according to claim 1, wherein the frequency of the pump laser is tunable and, as a result, it is possible to compensate the optical dispersion of the crystal and the variation in the optical lengths of the cavities, to obtain a continuous tuning over a frequency range of more than one THz.

* * * * *

UNITED STATES PATENT AND TRADEMARK OFFICE
CERTIFICATE OF CORRECTION

| | | |
|---|---|---|
| PATENT NO. | : 8,542,435 B2 | Page 1 of 2 |
| APPLICATION NO. | : 13/426522 | |
| DATED | : September 24, 2013 | |
| INVENTOR(S) | : Myriam Raybaut et al. | |

It is certified that error appears in the above-identified patent and that said Letters Patent is hereby corrected as shown below:

In the Drawings, Figure 6, replace the original drawing as filed with the corrected replacement drawing as attached.

Signed and Sealed this
First Day of April, 2014

Michelle K. Lee
*Deputy Director of the United States Patent and Trademark Office*

Figure 6